United States Patent [19]

Bhatti

[11] Patent Number: 4,561,870
[45] Date of Patent: Dec. 31, 1985

[54] METHOD OF MAKING GLASS FIBER FORMING FEEDERS

[75] Inventor: Mohinder S. Bhatti, Granville, Ohio

[73] Assignee: Owens-Corning Fiberglas Corporation, Toledo, Ohio

[21] Appl. No.: 639,170

[22] Filed: Aug. 9, 1984

[51] Int. Cl.⁴ .............................................. C03B 37/08
[52] U.S. Cl. ......................................... 65/1; 264/507; 425/405 H; 228/243; 228/263.19
[58] Field of Search ...................... 65/1; 264/500, 507; 156/272.2; 425/405 H; 419/49, 68; 228/242, 243, 263.19

[56] References Cited

U.S. PATENT DOCUMENTS

| 3,897,531 | 7/1975 | Overhoff et al. | 425/405 H X |
| 3,956,452 | 5/1976 | Saito | 425/405 H X |
| 4,085,790 | 4/1978 | Wittmoser | 425/405 H X |
| 4,342,578 | 8/1982 | Bhatti et al. | 65/1 |

Primary Examiner—Robert Lindsay
Attorney, Agent, or Firm—Ronald C. Hudgens; Robert F. Rywalski; Greg Dziegielewski

[57] ABSTRACT

A method of making an orificed discharge wall for supplying a plurality of streams of molten glass to be attenuated into filaments is provided comprising inserting elements in apertures in a member; adhesively securing an elastic membrane to said member and elements, said membrane adapted to isostatically transmit pressure to said elements and member; applying isostatic pressure to the elements and member to mechanically seal the elements to the member; and fusing the mechanically sealed elements and member together to prevent the unwanted passage of molten glass between said elements and said member, said elements having an orifice to permit the passage of molten glass therethrough to establish said streams.

10 Claims, 3 Drawing Figures

METHOD OF MAKING GLASS FIBER FORMING FEEDERS

TECHNICAL FIELD

The invention disclosed herein relates to the production of glass fibers and glass fiber forming feeders.

BACKGROUND ART

With the production of glass fiber forming feeders having an ever-increasing number of orifices or tips to supply the streams of molten material to be attenuated into filaments, the need for effective and efficient systems for attaching the orificed tips or elements in the apertures in the discharge wall has also increased. Previously, the individual projections or tips were welded to the discharge wall by conventional welding techniques, such as cold resistance welding, electron beam welding, laser welding and the like. In essence, each of these systems welded a single tip at a time. With fiber forming feeders having as many as 4,000 or more tips, the welding process can be quite time consuming. Further, there are other problems associated with the systems which are well known in the art.

DISCLOSURE OF THE INVENTION

This invention pertains to a method of making an orificed discharge wall for supplying a plurality of streams of molten inorganic material to be attenuated into filaments comprising: inserting elements in apertures in a member; adhesively securing an elastic membrane to a surface of said member and said elements positioned therein, said membrane being adapted to isostatically transmit pressure to said member and elements; applying isostatic pressure to the sheathed elements and member to mechanically join or attach the elements to the member; and fusing the elements to the member to prevent the unwanted passage of molten glass between said elements and said member, said elements having an orifice to permit the passage of molten glass therethrough to establish said streams.

BEST MODE OF CARRYING OUT THE INVENTION

Figure 1:
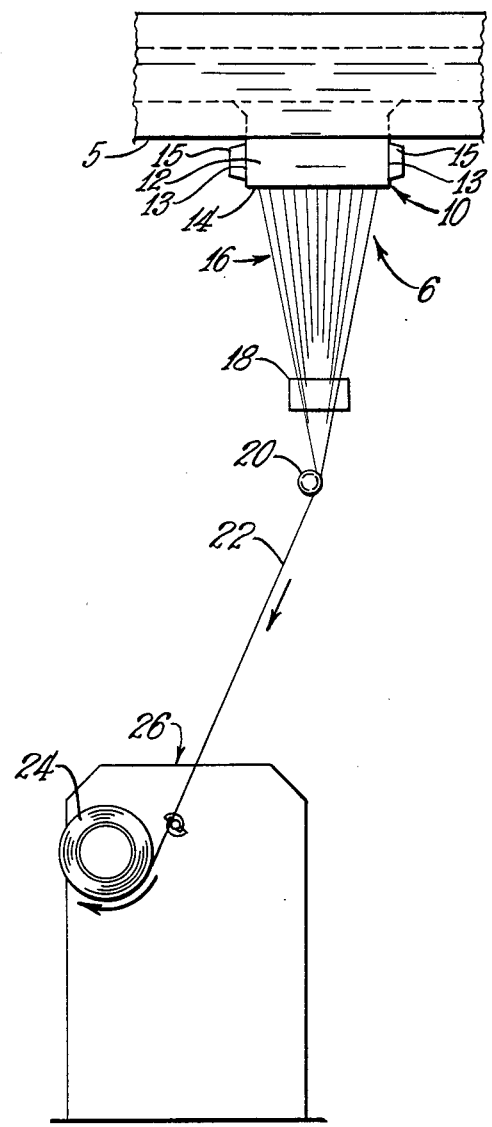
FIG. 1 is a semi-schematic, front elevational view of a glass textile type fiber forming system.

As shown in FIG. 1, feeder 10, which is comprised of an orificed bottom or discharge wall 14 and other sections such as containment or sidewalls 12 and end walls 13, is adapted to provide a plurality of streams of molten inorganic material, such as glass, through a plurality of orificed elements 85. Molten glass is supplied to feeder 10 by means of forehearth 5. Feeder 10, including discharge wall 14, is electrically energized via terminals 15 joined to a suitable source of electrical energy (not shown) to heat the glass therein as is known in the art. As shown, terminals 15 are joined to end walls 13, but terminals 15 may extend outwardly from bottom wall 14, if desired. The streams of molten glass can be attenuated into filaments 16 through the action of winder 26 or any other suitable means.

As is known in the art, size applicator means 18 provides a coating or sizing material to the surface of the glass filaments which advance to gathering shoe or means 20 to be collected as an advancing strand or bundle 22. Strand 22 is then wound into package 24 upon a collet of winder 26 as is known in the art. Thus, FIG. 1 schematically represents a "textile" fiber forming system.

Member 69 may be comprised entirely of any suitable material, such as a platinum and rhodium alloy which, for example, is well known in the art. Or, member 69 may be based upon a laminate comprised of a refractory metal core having an oxygen impervious, precious metal sheath formed by hot isostatic pressing (i.e., HIP) as is disclosed in U.S. Pat. Nos. 4,342,577, 4,348,216, 4,343,636 or 4,404,009, for example.

Figure 2:
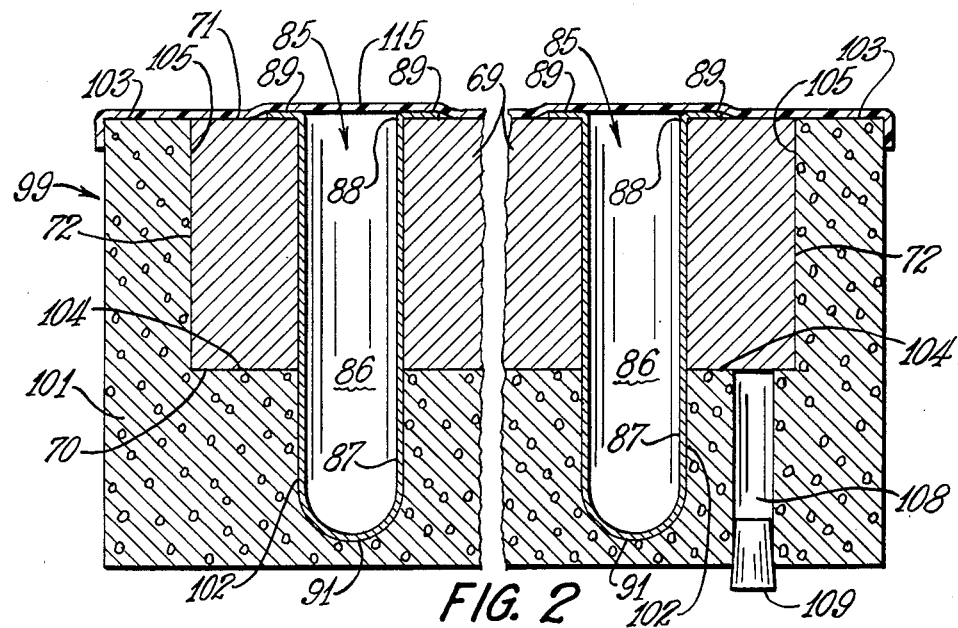
FIG. 2 is an enlarged cross-sectional view of the discharge wall of the feeder shown in FIG. 1 during fabrication according to the principles of this invention.

FIG. 2 depicts a portion of a discharge wall at a point during fabrication according to the principles of this invention. As such, elements or tips 85 are positioned in apertures 71 in member 69. In abutting engagement with one side of member 69, a support body 101 having a plurality of recesses 102 oriented to receive the projecting portions of elements 85 may be employed to seal and protect the opposite side of the member and projecting ends 91 of elements 85 during pressing.

Preferably, support body 101 is made from any suitable firm but elastomeric compound such as a polyvinyl chloride (PVC) or a urethane. However, support bodies may be fabricated from other materials such as wood or metal. Generally, support body is sufficiently rigid to preclude transmission of the hydraulic pressure in an isostatic manner to the "bottom" side 70 of member 69, that is, the side of member 69 in contact with support body 100, as well as to the exterior of sleeve 87 projecting from member 69 and the lateral edges 72 of member 69. As such, pressure is isostatically applied to the flange 89, the interior of sleeve 87, and the first side 71 of member 69 in contact with flange 89. Desirably, the material of support body 101 should not bond to the elements 85 or member 69 during pressing.

Figure 3:
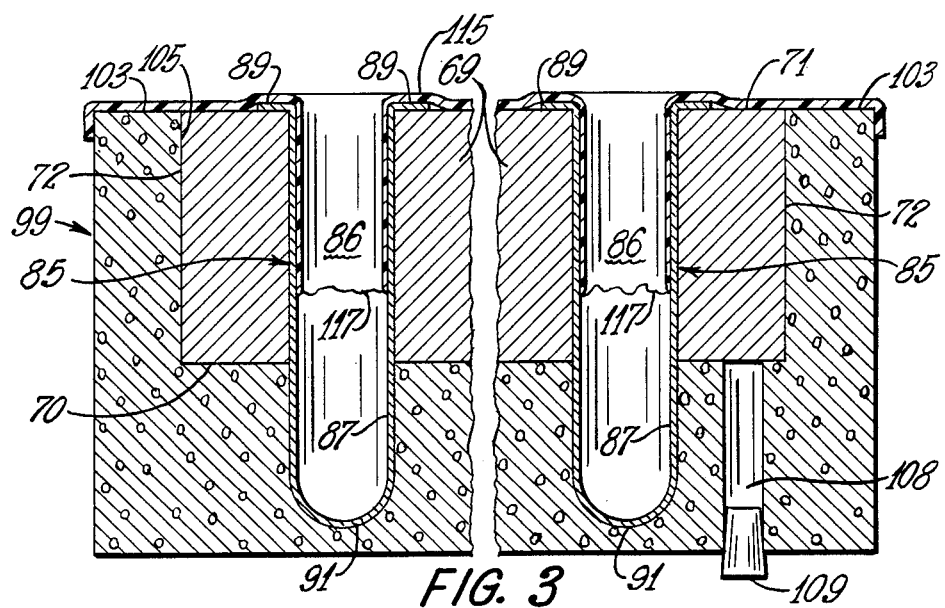
FIG. 3 is an enlarged cross-sectional view of the discharge wall of FIG. 2 during and subsequent to the application of isostatic pressure.

A section of an elastomeric or highly stretchable adhesive tape is applied to first side or upper surface 71 of member 69 and flanges 89 of elements 85, preferably as a continuous layer thereover. As shown in FIGS. 2 and 3, elastomeric adhesive tape 115 extends beyond the lateral edges 72 of member 69 to permit tape 115 to be adhered to body 101 along upper surface 103 thereof.

Thus, member 69 and elements 85 positioned therein, are enclosed within elastic body 101 and adhesively secured membrane or tape 115. Tape 115 must be capable of isostatically transmitting fluidic pressure to member 69 and elements 85 and must prevent the migration of the working fluid, such as "oil", in a cold isostatic pressing (CIP) unit between the mating surfaces of member 69 and elements 85. As shown in FIGS. 2 and 3, body 101 conforms to member 69 and elements 85 such that one major surface of member 69 is in contact with the recessed or second surface 104 of body 101. Further, the lateral edges 72 of member 69 are in contact with lateral walls 105 of body 101. Preferably, the upper surface 103 of body 101 is substantially flush with the flange receiving side of member 69.

To facilitate the mechanical sealing or bonding of elements 85 to member 69, a vacuum is drawn between member 69 and body 101. As shown, body 101 includes a passageway or port 108 extending from the exterior of body 101 to recessed surface 104. By connecting passageway 108 to a suitable source of vacuum, the undesirable gas or atmosphere otherwise retained between body 101 and member 69, as well as around elements 85, is removed. After drawing the vacuum, passageway 108 is sealed by any suitable means, such as plug 109.

After cold isostatic pressing, the mechanically bonded elements 85 and member 69 may be heated, such as a furnace, to fuse the elements 85 to member 69 to prevent the unwanted passage of molten glass therebetween as set forth in U.S. Pat. No. 4,447,248, issued on May 8, 1984 to me. Or, member 69, having elements 85 mechanically bonded thereto, may be joined directly to the remaining sections to form feeder 10, which is subsequently electrically energized to resistively heat feeder 10 including member 69 to fuse elements 85 thereto, in situ, as set forth in U.S. Pat. No. 4,441,904, issued on Apr. 10, 1984 to me.

A glass fiber forming feeder 10 discharge wall 14 was fabricated from a platinum-rhodium alloy plate or member 69 and a plurality of platinum-rhodium alloy elements or tips 85. As such, member 69 contained a plurality of apertures 71 which each received an element 85. Each of the elements or tips 85 were comprised of a sleeve 87 and a flange 89. An orifice 86 within sleeve 87 extended from first end 88 at flange 89 to a second end 91 along sleeve 87. As shown in FIG. 2, second end 91 was closed. However, it is to be understood that tips 85 may be supplied with an open second end 91 such that orifice 86 extends completely through element 85.

The elements 85 were inserted into apertures 71 of member 69 such that flange 89 was in abutting engagement with one side of member 69 and such that a portion of sleeve 87, including second end 91, extended beyond the opposite side of member 69.

A support body 101 of precured, plasticized PVC having recesses 102 therein was positioned over the protruding portion of elements 85 such that body 101 was in abutting engagement with member 69 with sleeves 87 in recesses 102. A liquid impervious, elastomeric membrane 115 having an adhesive on one side thereof was secured to upper surface 71 of member 69, flanges 89 of elements 85 and upper surface 103 of body 101 to seal the member 69 and elements 85 therein; thus forming assembly 99. Assembly 99 was connected to a source of vaccum to evacuated assembly 99. Since tape 115 is secured to flanges 85, orifice 86 of element 85 is not evacuated.

The sealed, evacuated assembly 99 was then placed in the oil bath of a cold isostatic pressing (CIP) unit, and a pressure of about 150,000 psi was exerted on the unit to mechanically seal or join elements 85 to member 69. Since cold isostatic pressing was employed, the operation was carried forth at approximately room temperature.

The elastomeric tape 115 should be sufficiently elastic and thin to permit tape 115 to be elastically deformed or stretched into the orifices 86 of elements 85 so that the hydraulic pressure of the working fluid of the CIPing unit is applied radially outward from within sleeve 87 of element 85 as well as against the flat of flange 89 to force flange 89 of element 85 into member 69.

As shown in FIG. 3, tape or membane 115 is elastically deformed into orifices 86 of elements 85 by the working fluid of the CIP unit during pressing. Generally, the length of sleeve 87 exceeds the ability of tape 115 to elastically deform. Thus ruptured edge 117 forms along the length of sleeve 87 within orifice 86.

Notwithstanding the rupture of membrane 115, the working fluid of the CIP unit is not permitted to migrate between the mating surfaces of elements 85 and member 69. As the pressure is applied, the portion of membrane 115 over orifice 86 is extruded downwardly into orifice 86 and is pressed into intimate contact with the interior of sleeve 87. The adhesive of tape 115 bonds to the interior of 87 providing the necessary seal in spite of the ruptured tape 115.

With tape 115 properly secured to flanges 89 of elements 85 and the associated surface of member 69, it is not necessary that the interior of elements 85 be evacuated, that is, have the otherwise remaining atmosphere therein removed. The atmosphere therewithin merely is compressed during pressing until the membrane 115 ruptures. Thus, only the edges of appertures 71 at the side from which elements 85 project, need be sealed from the working fluid of the CIP unit, which is accomplished by liquid impervious body 101 in this matter.

Subsequent to the application of isostatic pressure in the CIP unit, tape 115 and support body 101 were removed from mechanically joined member 69 and elements 85. The second ends 91 of elements 85 were then machined to open orifice 86 to permit the passage of molten glass therethrough.

Then the un-fused discharge wall sub-assembly comprised of the mechanically sealed elements 85 and member 69, was suitably joined to sidewalls 12 and end walls 13 to form feeder 10. Subsequently, feeder 10 was positioned beneath a supply of molten glass, a forehearth, as is known in the art. That is, feeder 10 was installed in the refractory 5 of a fiber forming position 6 so that molten glass can be supplied to feeder 10 for attenuation into filament 16. Then electrical power was supplied to gradually raise the temperature of feeder 10 to the desired level as is done with conventionally fabricated feeders. As such, upon electrically energizing feeder 10, and thus member 69, members 85 are fused to member 69 at flange 89 and sleeve 87.

Preferably, the material of tips or element 85 has a coefficient of expansion greater than that of member 69. As such, upon heating or energization of feeder 10, sleeves 87 of elements 85 tend to expand more than the internal diameter of the apertures 71 of member 69 such that sleeve 87 is even more intimately pressed into the portion of member 69 to defining aperture 71.

In the foregoing example, the elements 85 were comprised of H alloy (an alloy of 90% platinum and 10% rhodium) while the member 69 was comprised of J alloy (an alloy of 75% platinum and 25% rhodium). With regard to some alloys, such as J alloy, it may be desirable to anneal the sections (i.e., member 69 and/or elements 85) prior to CIPing, since work hardened J alloy may require excessive pressures to be employed before acceptable mechanical joining occurs.

To provide an effective mechanical seal between the elements and member in the isostatic pressing step, it is preferred that the isostatic pressure applied be greater than or equal to the yield point of the material of the elements 85 at the temperature employed for the pressing step.

Elastomeric adhesive tape 115 may be of any suitable type having appropriate stretchability and adhesiveness. For example, tape 115 may be comprised of a pore-free membrane selected from the group consisting of polyethelene-terphalate and polyvinyl chloride and an adhesive coating selected from the group consisting of polyvinyl acetate based resins and polyolefinic based resins. In the foregoing example, a high elongational elastomeric tape available from the 3M Company, known as "Scotch Tape No. 473", was employed.

As such, tape 115 and body 101 form a selectively evacuated, sealed protective system capable of selectively transmitting the hydraulic pressure in an isostatic manner to the flange portions and interior of sleeve 87 to permit the mechanical bonding of flange 89 and sleeve 87 to member 69.

It has been found that operating the cold isostatic pressing unit at pressures from about 125,000 to 150,000 psi for approximately 5 minutes is suitable for H alloy as well as J alloy in the annealed condition.

If member 69 is comprised of a laminate having a refractory metal core as disclosed herein, feeder 10 is preferably surrounded in an inert gas, such as nitrogen, to prevent the oxygen containing atmosphere from oxidizing the refractory metal core prior to the fusion of the precious metal element 85 to the precious metal exterior layers of the laminate.

According to the foregoing procedures, if a tip 85, as shown in FIG. 2, is employed, the flange 89 will be fused to one surface of member 69, and sleeve 87 will be fused to the portion of member 69 defining the apertures 71 associated therewith. Further, if the refractory metal/precious metal laminate is employed as member 69, the sleeve of element 85 will fuse to the refractory core and precious metal layers to seal the refractory metal within a protective layer of oxygen impervious, precious metal to prevent the oxidation of the refractory metal at elevated temperatures.

Also, it is to be understood that element 85 may be of any suitable shape, and, in particular, flange 89 may be dispensed with and/or the length of sleeve 87 may also be substantially equal to the thickness of member 69 to provide a tipless orifice plate having orifices lined with a suitable material fused to the member 69.

Consistent with the disclosures of the patents referenced herein, the present invention may also find utility in fabricating rotary type fiber-forming feeders as well as the stationary "textile" type shown in FIG. 1.

It is apparent that, within the scope of the present invention, modifications and different arrangements can be made other than as herein disclosed. The present disclosure is merely illustrative with the invention comprehending all variations thereof.

INDUSTRIAL APPLICABILITY

The invention disclosed herein is readily applicable to the formation of continuous and/or staple glass filaments.

I claim:

1. A method of making an orificed discharge wall of a feeder for producing glass filaments from a plurality of streams of molten glass issuing therefrom comprising:
   inserting elements in apertures in a member;
   adhesively securing an elastic membrane to a surface of said member and said elements positioned therein, said membrane being adapted to isostatically transmit pressure to said elements and member;
   applying cold isostatic pressure to the elements and member having said membrane secured thereto to mechanically seal the elements to the member; and
   fusing the mechanically sealed elements and member together to prevent the unwanted passage of molten glass between said elements and said member, said elements having an orifice to permit the passage of molten glass therethrough to establish said streams.

2. A method of making an orificed discharge wall for supplying a plurality of streams of molten inorganic material to be attenuated into filaments comprising:
   inserting elements in apertures in a member;
   applying an elastic adhesive tape to the member and elements positioned therein, said tape being adapted to isostatically transmit pressure to said elements and member;
   applying cold isostatic pressure to the taped elements and member to mechanically seal the elements to the member; and
   fusing the mechanically sealed elements and member together to prevent the unwanted passage of molten glass between said elements and said member, said elements having an orifice to permit the passage of molten glass therethrough to establish said streams.

3. The method of claim 2 wherein the pressure is applied approximately at room temperature and the pressure is greater than or equal to the yield point of the material of the elements at such temperature.

4. The method of claim 3 wherein said tape is comprised of:
   a membrane selected from the group consisting of polyethelyne-terphalate and polyvinyl chloride; and
   an adhesive coating selected from the group consisting of polyvinyl acetate based resins and polyolefinic based resins.

5. The method of claim 2 further comprising: positioning said member any elements partially within a body and applying said tape to also contact at least a portion of said body.

6. The method of claim 5 further comprising: drawing a vacuum between said member and said body.

7. The method of claim 2 wherein said fusion step is effected by heating the mechanically sealed elements and member prior to joining said discharge wall to other sections of the feeder.

8. The method of claim 2 wherein said fusion step is effected by joining the pressed member and elements to sections to form said feeder; installing said feeder at a fiber forming position to receive molten glass; and then energizing the feeder to fuse the elements to the member.

9. The method of claim 2 wherein said inorganic material is glass.

10. The method of claim 2 wherein said elements have a sleeve projecting beyond said member and isostatic pressure is not applied to the exterior of said sleeves.

* * * * *